Feb. 25, 1936. A. EPSTEIN Des. Re. 19,866

KNITTED CAP OR SIMILAR ARTICLE

Original Filed May 16, 1931

Inventor
Alex Epstein

By his Attorney
Morris Finkelstein

Reissued Feb. 25, 1936

Des. Re. 19,866

UNITED STATES PATENT OFFICE 19,866

DESIGN FOR A KNITTED CAP OR SIMILAR ARTICLE

Alex Epstein, Brooklyn, N. Y., assignor to Epstein & Hammer, Inc., Brooklyn, N. Y., a corporation of New York Original No. 86,360, dated March 1, 1932, Serial No. 39,866, May 16, 1931, for 3½ years. Application for reissue October 14, 1933, Serial No. 49,480. Term of patent 14 years

*To all whom it may concern:*

Figure 1:
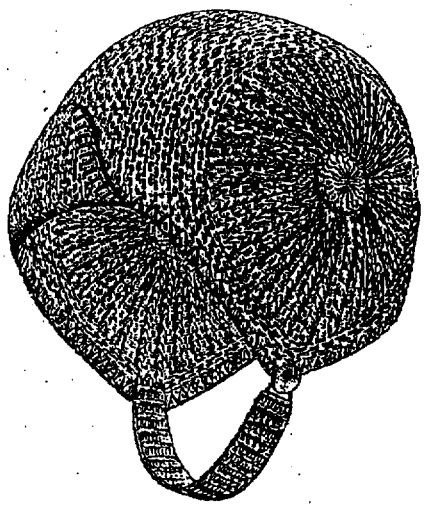
Figure 2:
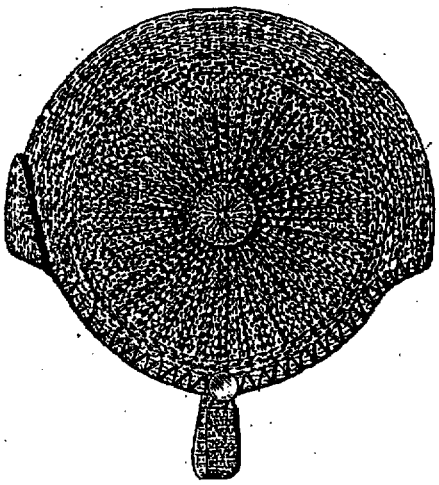

Be it known that Alex Epstein, a citizen of the United States and resident of Brooklyn, in the county of Kings and State of New York, has invented a new, original, and ornamental Design for Knitted Cap or Similar Article, of which the following is a specification, reference being had to the accompanying drawing, forming part thereof, in which, Fig. 1 is a perspective view of a knitted cap embodying my new design; and Fig. 2 is a side elevational view thereof.

I claim:—

The ornamental design for a knitted cap or similar article, substantially as shown.

Dated, October 9th, 1933.

ALEX EPSTEIN.